INVENTOR
RANSOM Y. BOVEE
BY
ATTORNEY

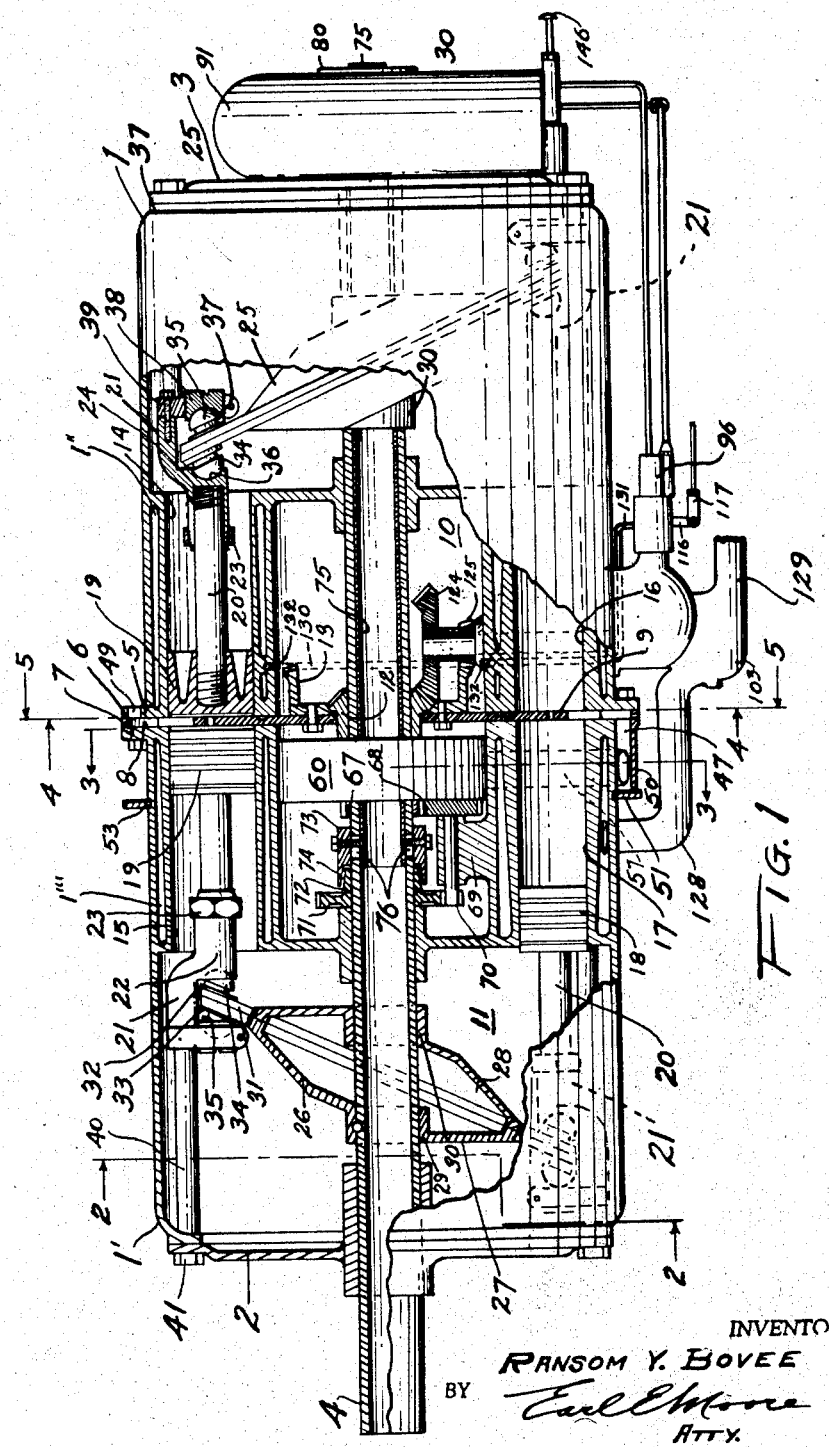

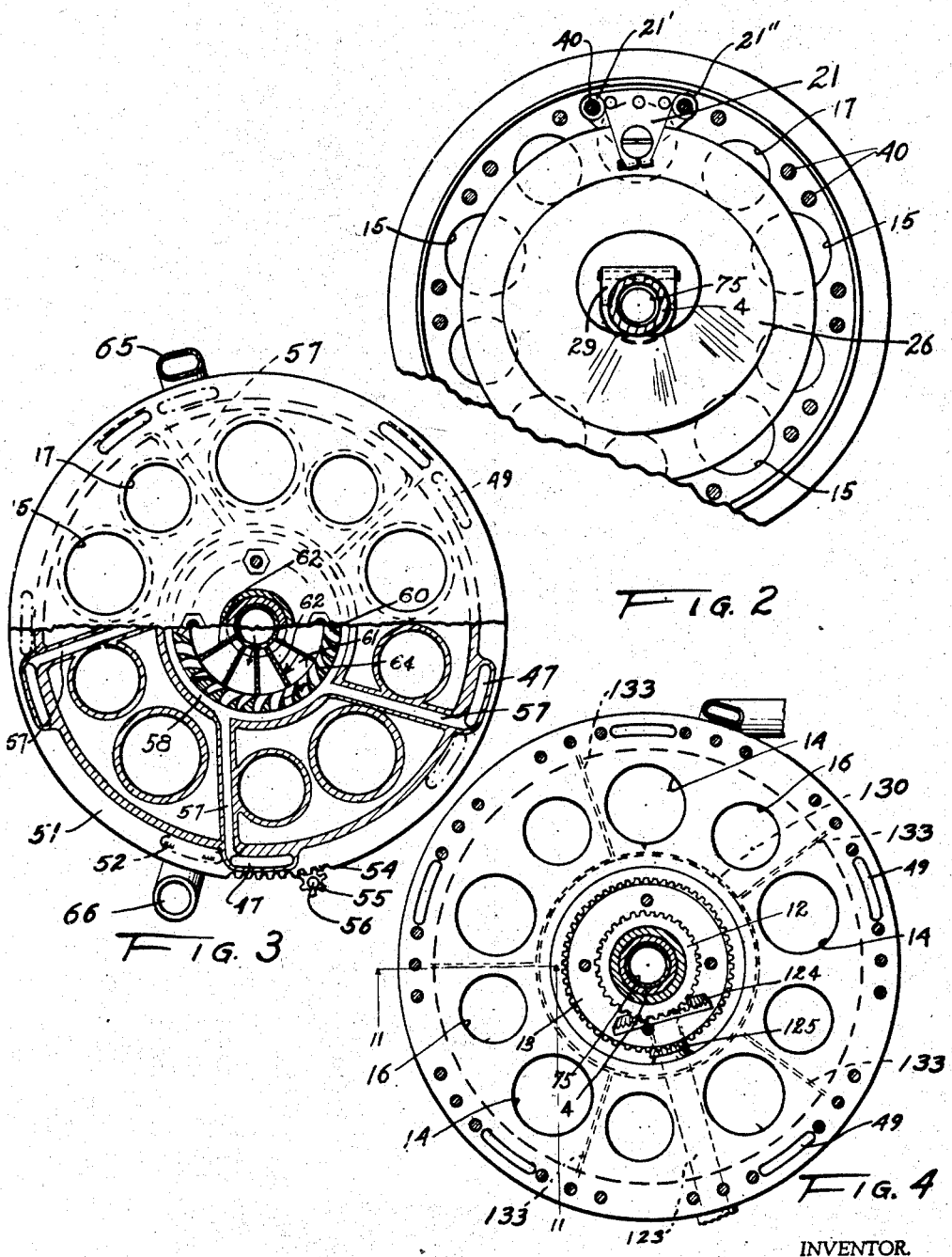

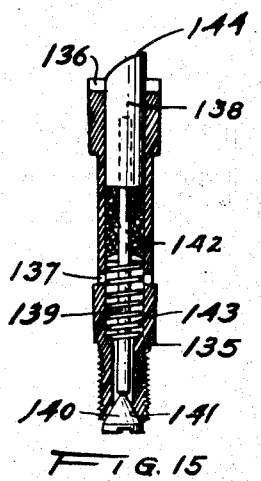
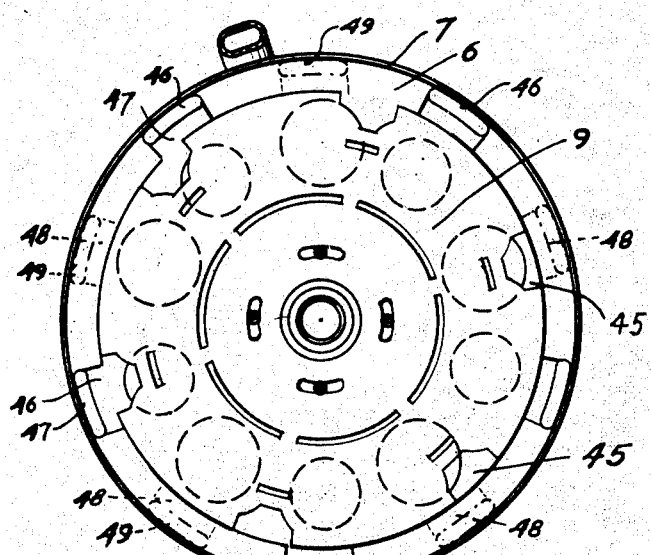
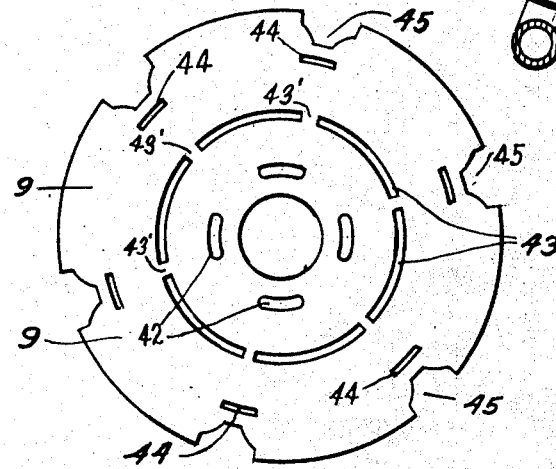
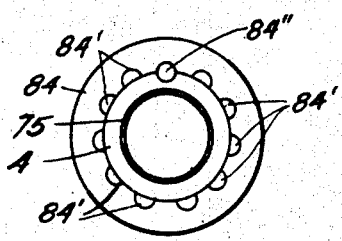
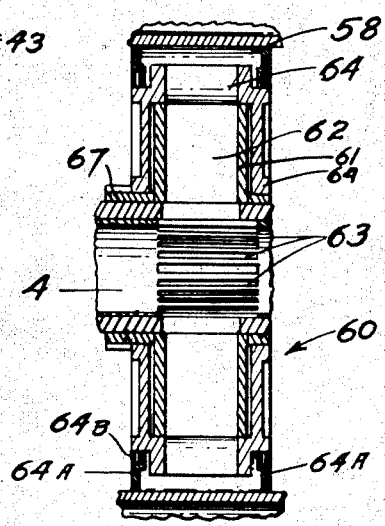

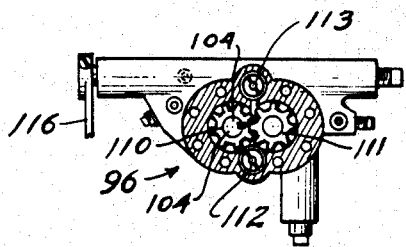
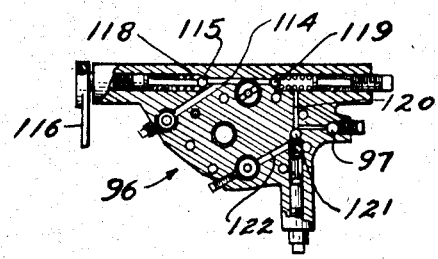
FIG. 8　　　FIG. 9
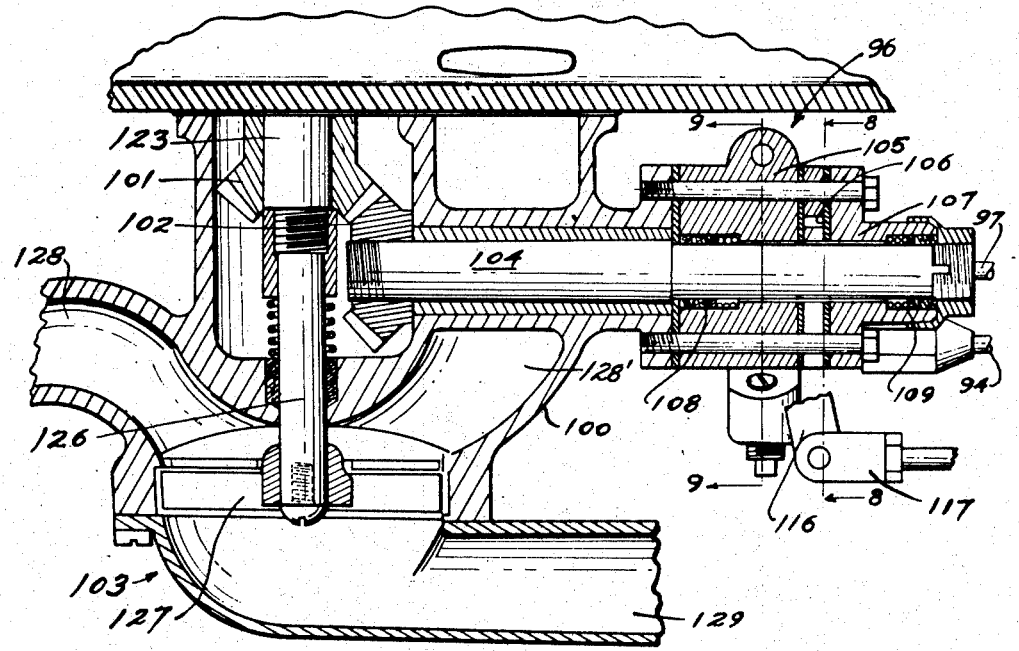
FIG. 10
INVENTOR.
RANSOM Y. BOVEE
BY Earl E. Moore
Atty.

Patented June 10, 1947

2,421,868

UNITED STATES PATENT OFFICE 2,421,868

BARREL TYPE ENGINE

Ransom Y. Bovee, Van Nuys, Calif.

Application April 23, 1943, Serial No. 484,201

12 Claims. (Cl. 123—58)

This invention relates to a crankless internal combustion engine employing but a single valve to control the ingress of fuel and air into a plurality of abutting cylinders and/or power units, and also for controlling the discharge of burned gases from the power units. As regards the cylinders of the engine of this invention, the engine has two similar or complementary-like parts with the open ends of their respective gas chambers in substantially the same plane, the two parts being separated only by a single valve plate that is common to all the cylinders. The disc shaped plate valve operates between two duplex opposed barrel engines and is a true monovalve for both engine parts.

By the duplex and opposing features of the two engine parts, ignition and complete combustion of the fuel gases is accomplished in a simple and economical manner, the engine operates in perfect balance, and, therefore, is vibrationless; it is substantially noiseless, the drag is reduced to a very low minimum, fire hazard greatly lessened, weight and costs are very low, and mass production made possible for this type of engine because of its simplicity and uniformity of like parts.

Although the engine of this invention may be arranged for electrical firing of the fuel, it is preferable to construct the engine for high gas compression firing in a manner somewhat similar to the Diesel engine principles.

Any number of power delivery cylinders and gas or air compression cylinders may be used in the engine of this invention. A gas-firing or igniter cylinder is paired with and connected to each power delivery cylinder for transmittal of hot high pressure gases to its respective power delivery cylinder via of a passage where a predetermined amount of liquid fuel is entrained and diffused in the hot firing gases. In the power delivery cylinders, the mixed explosive gas expands and disposes of substantially all its energy for substantially the full length of the strokes or displacement of the power delivery pistons.

Instead of the usual crank shaft, the power of the engine of this invention is transmitted from the power delivery cylinders to a crankless straight main drive shaft through a series of connecting rods that work in sliding manner along the edges of a pair of slant rotors or crank-discs, the discs having their hubs firmly fixed to the main drive shaft. This arrangement permits a large number of long power thrusts to the main drive shaft in perfect balance and assures a long dependable service for all working parts.

Each engine half or section may have any number of paired power delivery and gas compression cylinders, which when abutted with the like cylinders of the other half of the engine form a unitary power delivery engine with a single inbetween rotary valve, all the cylinders and valve having their respective working parts centered about a single crankless drive shaft. The engine of this invention is truly a duplex power delivery mechanism having multiple cylinder units opposed to one another. The arrangement of the cylinders and valve plate being such that carbon accumulating areas are eliminated, the pistons of the cylinders substantially abut against the sides of the single valve plate which makes possible complete scavenging of burnt gases and full power strokes, perfect balance of power thrusts, and reduce much friction and wear.

Some of the objects of this invention are as follows:

1. To present a duplex engine balanced on opposite sides of a single rotary control valve, the engine being very efficient in operation, simple in construction, and economical to manufacture.

2. To provide a super-engine capable of burning unrefined fuels and having means of transforming crude petroleum or liquid base fuels into instantaneous combustive action by inherent engine block means without the aid of carburetors, pre-heaters, atomizers or ignition devices.

3. To provide an engine capable of expanding the products of combustion in the development of power to the maximum extent of their useful power value.

4. To provide an internal combustion engine in which the expansive effort of the explosions is consumed in the power thrust, and substantially to a point where the exhaust pressure when released is substantially noiseless, heatless, flameless and pressureless.

5. To provide an internal combustion engine which mixes its air and fuel after top dead center of the working pistons, which prevents and obviates explosive effort from back-thrusting contra-to the running direction of the engine which consumes power, causes heating on the upward stroke of the piston heads, cylinders and compression spaces, unnecessary thermal heat losses, and unconvertable power loss in detrimental heat dissipation.

6. To provide an internal combustion engine which obviates the necessity of advance ignition and advance fuel introduction, which prevents and obviates pre-ignition, detonation, and two-way explosure to flame of the explosion ends of the cylinders.

7. To provide an internal combustion engine with automatic means of compression ignition inherent to the means and method of pre-compression of air, and fuel introduction thereinto and then transference to an independent cylinder for expansion and delivery of power.

8. To provide an internal combustion engine by which pre-compression of air to fuel-combustion temperature enables the fuel to be introduced into the air-stream while in transition from one cylinder to another, producing cyclonic turbulence and fuel atomization to a point of near-infinity, rendering the fuel and the air into a homogenized flaming gas thereby insuring complete combustion, and combustion after top dead center on the outward working stroke of the power delivery piston.

9. To provide a monovalve or one valve engine with a plurality of cylinders, in which all cylinders are equally served in their complete valving requirements with the one valve.

10. To provide a floating, equalized pressure, self-sealing, free-running, cooled and lubricated valve that is substantially effortless to operate, that is self-sealing from carbon and lubrication, which requires no attention, runs at low speed, and will sustain its seal and timing indefinitely.

11. To provide a monovalve engine with a single valve means whereby the explosions within the engine can be produced every revolution of the engine or two-strokes of the power delivery pistons, with the same positive control of intake air, compression, fuel introduction, ignition and exhaust as is now required in a four stroke engine.

12. To provide a monovalve engine whereby four-stroke functions occur in two-strokes without blowers or scavenging devices, whereby the single valve admits air induction, air-compression, compressed air transference, fuel introduction in a manner to cause 100% fuel diffusion, atomization to near-infinity, inflammation and combustion from air pre-compressed high temperatures, and a power stroke extending from the top of the power cylinder to the bottom before exhausting the products of combustion, all in the two-cycles of operation, utilizing up to 75 degrees more thrust than prevails in common practice.

13. To provide a monovalve engine which enables compound expansion of the explosions and expanding gases to nearly atmospheric pressure limits before being exhausted, in which the explosions are expanded to nearly two and two-thirds greater displacement before being exhausted than occurs in prevailing engines.

14. To provide a means where a relatively small displacement can be expanded into a larger displacement to obtain a full delivery of expansive explosive effort in working piston thrust before exhaust.

15. To provide an internal combustion engine with means of eliminating heat and power consuming cylinder-heads, carbon accumulating areas, hot-spots, unequal expansion, fire-setting dangers, as well as their usual extra weight, cost and cooling problems.

16. To provide an internal combustion engine design that brings all pistons into balanced opposition so that their inertia forces are equalized as well as the secondary forces acting upon them, and their thrust is not delivered against the frame of the engine but upon propulsion rotors which are in balanced opposition and on a rotating power-shaft, thus providing inherent balance and vibrationless operation without the necessity of counter-weighting or using dampers or dynamic balancers.

17. To provide a rhythmic, harmonic reciprocation of the pistons by utilizing slant-rim opposed rotors, thus providing a 25% uniform slower motion at the ends of the strokes than possible with a crank action. These slant-rim rotors displacing the usual cranks of shafts with their unbalanceable connecting rods, this permitting a longer stroke or displacement without additional cost.

18. To provide an engine with a central through-opening tubular power shaft, permitting of cannon fire or machine gun fire directly therethrough, and at the same time permit supercharger engagement or disengagement, supercharged air induction, and also the extension of means to control propeller pitch regulating devices either automatic by hydraulic pressure or by hand control means at the rear of the engine.

19. To provide a fuel supply system of a simple, reliable and inexpensive character, eliminating fuel nozzles, atomizers, fuel injectors, distribution and timing devices, fuel system in which metering and measuring devices become unnecessary, and nothing is required other than a fuel pump to supply the fuel under pressure to an internal fuel rail or manifold, thus a non-clog variable volume fuel supply is made possible, controllable at the pump with a simple throttle valve, providing greater flexibility than with carburetion or with Diesel practice.

20. To provide an engine which is small in overall diameter to cut down air drag in aircraft and which enables its installation in the wings or the fuselage of the plane to eliminate the factor of head resistance.

21. To provide an engine very light in weight in proportion to its horse power output, and reduce by one half the weight factor per horse power without the necessity of costly light weight metals, or the over-all machining required of air cooled engines.

22. To provide an engine design adaptable to engines of either small or very large horse power outputs without departure from the geometric plan, or principle of operation.

23. To provide an internal combustion engine free from the common causes of failure and wear and waste attendant in engines lacking the features of compound expansion.

24. To provide an engine with full scavenging, automatic ignition, floating self-sealing valve system, floating and guided pistons, floating power-shaft, 100% opposed operation of mechanical movements, inherent balance, long strokes, free running slant-rim-rotor drive, harmonic piston movement, splash lubrication to all moving parts, cool and almost pressureless exhaust without noise, vibrationless operation, and a non-clog fuel system.

Other objects, advantages and features of my invention will appear from the accompanying drawings, the subjoined detailed description, the preamble of these specifications and the appended claims.

It is to be understood that the drawings and description thereof are not to limit the invention in any sense whatsoever, except as limited by the appended claims.

In the drawings:

Fig. 1 shows a vertical elevational view of the invention with parts thereof broken away to show details in section.

Fig. 2 is a partial sectional view taken substantially along the line 2—2 of Fig. 1, but showing only one of the cross heads 21 in place.

Fig. 3 is a sectional view taken substantially along the line 3—3 of Fig. 1, and showing in dot-dash lines exhaust ports in the rear engine portion of the view.

Fig. 4 is a view taken substantially along the line 4—4 of Fig. 1, but showing a gear section complete in full lines.

Fig. 5 is a view taken substantially along the line 5—5 of Fig. 1, but showing exhaust ports toward rear of engine in dot-dash lines.

Fig. 6 is an elevational view of the rotary valve plate.

Fig. 7 is an enlarged vertical sectional view of an air blower or super-charger used in the invention.

Fig. 8 is an enlarged sectional view of an oil pump taken substantially along line 8—8 of Fig. 10.

Fig. 9 is an enlarged sectional view of the oil pump taken substantially along line 9—9 of Fig. 10.

Fig. 10 is a much enlarged sectional view of the oil pump and water pump and connected parts thereto.

Fig. 15 is a vertical sectional view showing a fuel injector valve on a large scale.

Fig. 16 is an enlarged vertical view, partly in section, of a detailed part of a thrust bearing.

Figure 11:
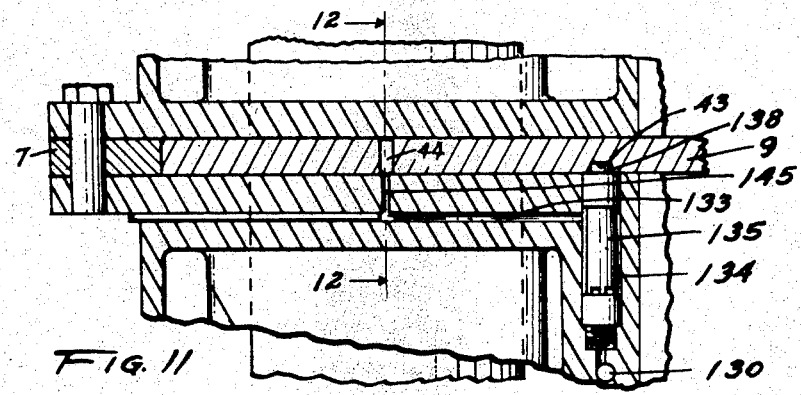
Fig. 11 is a much enlarged sectional view of a detail part of the invention taken substantially along the line 11—11 of Fig. 4.

The engine illustrated in the drawing and which comes within the purview of this invention, has a pair of abutting outer cylindrical casings or shells 1 and 1', the far ends of which are flanged to provide annular surfaces to accommodate the end disc-like sealing plates 2 and 3. The end plates are removable and may be held tightly against the ends of the shell by any suitable means such as bolts and the like. Each end plate is provided with a bearing to centrally and rotatably support a hollow shaft 4 with its ends open as shown. The two cylindrical shells at their abutting ends have the annular flanges 5 and 6 which are bolted together after first placing between them an annular spacer ring 7 which provides a shallow annular or ring-like area 8 to accommodate a rotatable mono-valve or rotary disc-shaped valve plate 9. This valve plate divides the engine and provides the two engine chambers 10 and 11. Each engine portion 1 and 1' are provided with water channels 1" and 1''' respectively, which surround their respective cylinders to be later explained.

The valve plate has a central circular opening which is journalled onto the outer surface of the collar of a bevelled gear 12, the bevelled gear being journalled to the outer surface of the main drive shaft 4. To a central portion of the valve plate surrounding the opening thereof is fixed the flange of a ring gear 13 which meshes with means for slowly turning it and which will be explained later.

The disc-shaped plate 9 is a rotary engine head or partition between a plurality of power delivery cylinders in chambers 10 and 11 and also between a plurality of gas heating or air compressor cylinders in the chambers 10 and 11. All the power delivery cylinders in chamber 10 are indicated by the numeral 14, and the similar abutting power delivery cylinders of chamber 11 are indicated by 15. The compressor cylinders in chamber 10 are indicated by 16, and the similar abutting compressor cylinders of chamber 11 are indicated by 17. The power delivery and compressor cylinders all have the usual internal combustion engine type pistons 19 and 18 respectively, all of which are provided with a threaded bore into each of which is threaded one end of a rigid piston rod 20.

Attached to the outer ends of the piston rods 20 are the cross heads or slide connector units 21 coupled to their respective piston rods by a threaded and tapered offset extension 22 which is split axially thereof so that when the nut 23 is screwed thereon, the extension is squeezed to a smaller compass to snugly grasp the piston rod. The very end of the piston rod is screwed to the inner portion of the extension at 24 in order to be rigidly and firmly held thereto. Means is combined with each connector unit to slide smoothly around the outer margin of a slant-rim rotor or wobble type crank which vacillates when the drive shaft 4 is rotated; one of these wobble cranks is designated 25 and the other 26.

Each wobble crank is made of two stamped sections 27 and 28, configurated as shown, having flanges 29 and 30, respectively, which are keyed to or otherwise fixed to the drive shaft. The sections are provided with the marginal extensions 31 along which the connector units 21 slide. Since these wobble cranks are inclined and must rotate with the shaft in a circular cylinder, the cranks are elliptic in edge contour so that all its edges will remain equally spaced from the inner surface of the cylinders 1 and 1'.

Each slide connector has a pair of spaced apart slide plates 32 and 33, the plate 32 having the semi-spherical ball 34 extended therefrom, and the other plate having the semi-spherical ball 35 extended therefrom. A portion of the connector just beyond the outer end of the piston rod, has a cavity or semi-spherical socket 36 which accommodates the ball 34, and a similar socket 37 in a threaded bushing 38 accommodates the ball 35. The bushing 38 is threaded into a bracket 39, the top of the bracket being fixed by a bolt to an end portion of the connector 21, the bracket is split at its bottom where it encircles the bushing so that the bushing can be held firmly by tightening a screw after the bushing has first been adjusted. Each connector 21 is also provided with ears 21' and 21", see Fig. 2, which have bearings for reciprocation on the fixed guide rods 40. One end of these rods extend through the cylinder flange and its end plate, and the other end is threaded into the cylinder block. A nut 41 holds the end plate and rods securely together.

Because of the above recited arrangement of the various pistons, piston rods, connector units, guide rods, slide plates and sockets, and wobble crank, on each side of the engine, the reciprocation of the power delivery pistons 19 force the wobble cranks to rotate the drive shaft 4, and which in turn through the same wobble cranks reciprocate the air compressor pistons 18.

By referring to Figs. 5 and 6 of the drawing, a better understanding of the valve disc or plate 9 can be had. The valve plate has the slots 42, four in number, arranged to receive the bolts that hold the ring gear 13 thereto. Next in order, there are the oil injector cam grooves 43, six in number, to be explained later, transfer ports 44, six in number, to be explained later, and the intake-exhaust ports 45, six in number. These latter ports 45 admit air into the air compressor cylinders 16 and 17 when connecting them with the air intake gaps 46 and air passages 47, and these same ports 45 exhaust waste gases from the power delivery cylinders 14—15 when connecting them with the exhaust gaps 48 and exhaust openings 49. The air intake passages 47 have their outer ports or openings 50 to the atmosphere closeable by an annular ring 51, note Fig. 3, which ring has five openings 52 and slides in a groove 53 of the outer wall of the cylinder or engine shell 1'. This free air control valve ring has a few teeth 54 at its lower edge which is in mesh with a pinion gear 55. The pinion gear is keyed to a hand control rod 56 so that all the free air intake ports can be closed or opened.

Each passage 47 connects with a forced air passage 57, all of which enter into a circular air passage 58 that encircles an air supercharger 60. This supercharger has a center vaned wheel 61, the vanes 62 of which are fixed to the drive shaft between slots 63 thereof which admit air from the interior of the hollow shaft into the spaces between the vanes 62. When this vaned wheel rapidly rotates in the direction indicated by the arrow, it draws air from the hollow shaft and forces it into the ring shaped vaned wheel 64. This wheel 64 moves in the opposite direction of wheel 61 and forces air under higher pressure into the circular space 58 and into the passages 57.

The inner vaned wheel of the supercharger gets its power directly from the drive shaft, whereas, the outer faster vaned wheel 64 receives its power through a gear 67, to which it is fixed, and a series of stepped gears. This gear 67 is meshed with gear 68 which is journalled in the block 69 by a shaft having at its end a small pinion gear 70 meshed with a large driving gear 71, and this gear is journalled onto the drive shaft 4. This gear 71 has a tapered flange or clutch cone 72 which forms a complementary part of a remote controlled clutch. The other complementary part of the clutch is a collar 73 having a tapered shoe portion or engager 74 that is designed to grip the tapered flange 72 when the collar 73 is shifted toward the gear 71 by shifting an inner liner pipe 75. This liner pipe is attached to the collar by a pair of opposed bolts which pass through the slots 76 and force the collar and liner pipe to turn with the shaft 4.

The pipes 65 and 66, shown in Figs. 3 and 5, are water circulating passages for connecting all the water jackets or passages, shown in Fig. 1, with a heat radiator (not shown) so as to maintain the engine at a running heat that will not impair the efficiency of the engine.

Figure 14:
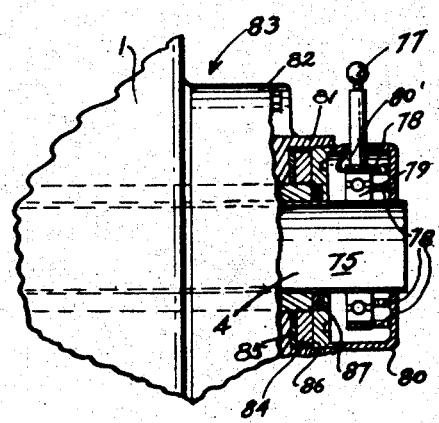
Fig. 14 is an enlarged elevational view of a portion of the rear end of the engine with parts broken away to show details, the pressure tank 91 being omitted.

The liner pipe 75 is reciprocable in the shaft by the lever 77 at the rear of the engine, see Fig. 14. This lever is coupled to the rotatable liner pipe by the ball bearing cage 78 which rides the raceway of collar 79. The raceway 79 is fixed to the liner pipe 75 and rotates therewith. The coupler is housed in a hub cup 80 suitably secured to an extension 81 of a casing 82 of a starter device, the said hub cup being provided with a side opening cam slot 80' in which the manually operated lever 77 is rotated. The liner pipe 75 may be reciprocated to engage or disengage the air supercharger driving clutch 72 via of the shoe 73 which is secured to its opposite extremity. When the clutch 72 is engaged by side movement of lever 77, a plurality of finger springs 78 behind the non-rotating ball race 79 maintains the necessary pressure to keep shoe 74 in driving engagement with 72. In this same part of the engine is the power shaft thrust bearing 84, see Figs. 14 and 16, having its center thrust plate threaded upon the end extension of the main drive shaft 4 and has a plurality of half keyways 84' so that the axial position of the shaft may be changed and a key 84" inserted in the desired notch to prevent the changing of its adjusted position, the purpose of the adjustment being the means of centralizing the plate valve 9 between the meeting strokes of the pistons to prevent striking contact of the pistons against the intermediate valve plate 9. By shifting the power shaft and piston assembly backward or forward to such central position, and then locking thrust plate of bearing 84 to shaft 4 by screwing the back end thrust plate 86 against spacing ring 87, which encloses the adjustable thrust bearing 84 in its thrust cage and holds the power shaft and piston assembly in its fixed working position with respect to the pistons and the valve.

Figure 13:
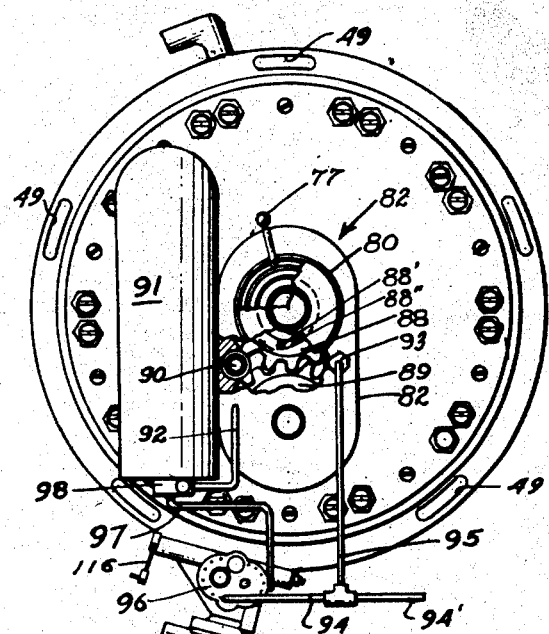
Fig. 13 is a normal sized end elevational view of the engine with parts broken away to show details.

The starter device 83 comprises the casing 82 having journalled therein the mating pair of oil driven starting gears 88 and 89, the gear 88 having a free wheeling bearing upon the power shaft 4, being adapted to stand without rotating while the engine is running, but when the engine is idle and the gear 88 is rotated forward, as indicated by arrow in Fig. 13, it rolls a grip roller 88' into a narrowing wedge track 88", thereby gripping the gear to the power shaft when driving force is applied to the free wheeling grip gear 88, thus this wedge unit acts as a starting clutch. 90 is the oil port pressure entrance to gears 88 and 89 and connects to a starting valve 98 via pipe line 92 to an air cushioned starting pressure tank 91. This tank is kept automatically fuel-oil pressure charged from starting pressure take off outlet 97 (Fig. 9). The oil passes around the teeth of gears 88 and 89 and outlets through port 93 and back into the fuel supply line to the fuel pump via of pipes 95 and 94. Thus rotating gears 88 and 89 and forcing gear 89 to clutch the power shaft 4 for producing starting rotation of the engine. When the engine starts, the rotation of shaft 4 releases roller clutch 88' in gear 88 and frees the starter. Hand pump charging of tank 91 may be provided for but is not shown. The pipe 94 leads to a source of oil supply not shown.

The oil pump is shown best in Figs. 8, 9 and 10, Fig. 10 being drawn to a very large scale, in which the pump 96 is shown as being supported at one end of a casing 100 which houses a set of two gears 101 and 102, as well as a water circulating pump 103. A shaft 104 extends through the casing from gear 102 and a reduced section thereof passes through the oil pump housing. This housing comprising a main body 105, pump chamber 106 and end fitting 107; the usual packing glands 108 and 109 being shown around the shaft on each side of the pump chamber to reduce pressure loss. The gear pump for the oil has a gear 110 keyed to the shaft 104 which is meshed with a similar gear 111 journalled in the walls of the chamber. The fuel inlet to the pump is at 112, and the outlet at 113. The outlet leads into a passage 114, to the left of which (Fig. 9)

is a throttle valve 115 controlled by the lever 116 that is connected to a remote control via of crank and linkage rod device 117 (Fig. 10). From the passage 118 of the pump, the oil under very high pressure, connects with a pipe direct to a fuel rail or ring to be explained later.

A fuel oil pressure regulator valve 119 governs the pressure to the fuel rail and allows excess oil to enter the passage 120 where starter tank pipe 97 connects therewith in a branch thereof. A starter pressure regulator valve 121 governs the pressure to the starter tank, excess oil enters the passage 122 which connects with the vented fuel supply pipe 94.

The gear 102 is in mesh with gear 101, the gear 101 having connection with a shaft 123 that passes through the shell 1 and supports a gear set having the gear 124 and pinion gear 125. The lower reduced end 126 of the shaft 123 connects with the propeller 127 of the water pump and forces cooling water to the engine cylinder jackets via of ducts 128 and 128' and from a radiator, not shown, via of duct 129.

By referring to Fig. 1, the pinion gear 125 is shown as meshed with the ring gear 13 for rotation of the valve plate 9. The larger gear 124 meshes with the gear 12 so that the drive shaft is used for turning the valve plate, running the fuel pump and for running the water pump. The R. P. M. of the valve is set to run at one-sixth shaft speed.

The fuel rail is indicated at 130, note Figs. 1, 4 and 11, which is connected to the fuel passage 118 of the oil pump via the pipe 131. This fuel rail 130 is an annular groove in the cylinder block of engine side 1, which groove is made into a tubular passage by welding, brazing, or freezing an annular ring 132 therein, as shown. From the fuel rail radiates the five nozzle communication passages 133, each of which has an enlarged valve chamber 134. In each valve chamber, there is screwed a valve casing 135 which is slightly tapered from above the threaded portion to the top thereof so that it will tightly seal itself against the walls of the chamber when it is drawn tightly into the threaded portion at the bottom of the chamber. At the top of the casing is a screw slot 136 so that the casing can be rotated for placing and removing same. Near the middle of the casing are outlet ports 137 which communicate with the fuel injection or nozzle communication passages 133, see Figs. 11 and 15.

Within the valve casing is a plunger or valve stem 138 with an elongated extension 139 which has a frusto-conical valve head 140 adapted to seat itself on a valve seat 141 around the bottom opening of the casing. The usual sealing packing 142 and spring 143 are provided in the casing, the spring forcing the valve to closed position. At the top end of the stem is a cam rider surface 144 which slips along over the cam surface in the grooves 43 of the valve plate 9. Whenever the surface 144 rides upon the raised portions 43' between the grooves, the injector valve 140 is opened and high pressure fuel oil is forced between the casing 135 and stem 139, out through the ports 137 and into the passage 133.

Each passage 133 leads to a fuel jet or injection nozzle 145 which sprays the fuel into the communicating transfer slot or port 44 of the valve plate 9 from which slot or port the fuel oil along with the hot firing air from the compressor cylinders are forced by their own pressure into the power delivery cylinder. Full and complete expansion occurs in each power delivery cylinder until the end of the piston stroke.

*Operation*

Figure 12:
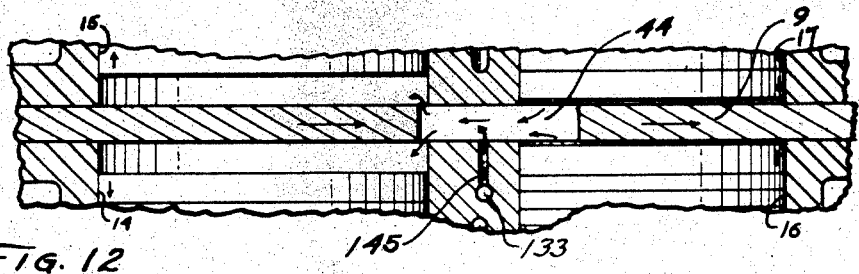
Fig. 12 is also a much enlarged sectional view of a detail part of the invention taken substantially along the line 12—12 of Fig. 11.

To start the monovalve engine herein illustrated, the starting button 146, see Figs. 1 and 13, is pulled for opening valve 98. This operation admits fuel oil under high air cushion pressure from starter storage tank 91 to starter gears 88 and 89 and drives gear 88 forward on the drive shaft 4 and engages it through action of the wedge collar 88'. The fuel oil from starter tank 91 enters the gears at the high pressure side 90 and exhausts at 93 and reenters fuel supply line 94 through pipe 95. Upon rotation of shaft 4, fuel pump 96, driven by connecting means involving gears 12, 124, 101 and 102 rotates fuel pump shaft 104 and pump gears 110 and 111 which force fuel oil from pipe 94 through intake port 112 of the pump, Figs. 8, 9 and 10, delivering pressured fuel oil into distribution passage 114 controlled by regulator escapement valve 119. From distribution passage 114, by opening throttle valve 118, the high pressure fuel oil passes through the engine casing to the fuel oil distributing ring 130. Thereupon, the fuel passes through admission valve 135, see 15 and 11, through passages 133, Fig. 12, and out injection jets 145 into monovalve high compression transfer ports 44 which in progressive sequence admit fuel into the compression heated air streams being swept through transfer ports 44 from air compression cylinders 16 and 17 into the explosion cylinders or power delivery cylinders 14 and 15. The pre-compression temperatures from compressor cylinders 16 and 17 exceed 1000 degrees of temperature, and approach a mile a second speed in transit from cylinders 16 and 17 through transfer ports 44 and into explosion cylinders 14 and 15; thus, exploding the homogenized fuel and air mixture against pistons 19 which, and their cylinders 14—15, are sealed by valve 9 after charging with the explosive mixture from the ports 44. Expansion from the explosions drives pistons 19 in cylinders 14 and 15 outward from each other resulting in power thrust against ball socketed thrust slippers 34 which ride the marginal surfaces, front and rear, of wobble crank discs 25 and 26 producing rotation thereof and the driveshaft 4.

The modus of functional operation permitting the adaptation of the single monovalve to this type of an engine is based upon the combining of four-cycle functions in two-cycles of functional operation, adaptation of balanced or equal opposition of opposing forces against the monovalve, the creating of a four cylinder coactional opposed group or set of cylinders which through duplex-opposition astride a cylinder-head valve, the cylinders being set in large then small tandem fashion so that each engine side has five sets of cylinders which are opposed by a like cylinder arrangement in the other side of the engine, thus making possible by two-stroke operation the adaptation of a common exhaust and intake port in the valve to serve both exhaust and intake functions from one cylinder to the other in a revolution of the engine and the piston movement. Also permitting the adaptation of a single air transfer port between the opposition pairs of large and small cylinders to act in timed sequence to commence the transfer of air from the two opposed air compressor cylinders 16 and 17 respectively to the two larger explosion cylinders 14 and 15 after the end dead center meeting of the explosion cylinder pistons 19 on either side of the valve 9, and then cutting off the communication therebetween when the smaller pistons 18 meet as their reversal movement begins. Thus, a four-cylinder opposed coactional set with an accompanying valve is created, within a limited arc of movement of both the valve and the segment of the arc occupied by the four-cylinder set or group as it relates to the circle around which the cylinders are set in opposition. There being room for both valve movement and high compression ratios adequate for compression ignition in a circle for a maximum of five sets of cylinders, each set from one to five being a complete engine in itself not dependent upon any of the other four sets to function. Each set is preferably segmented into 72 degrees of the circle of 360 degrees, which enables a lag or drag action of the pistons 18 of 31½ degrees to approximately 33½ degrees after the explosion pistons 19 have reached top-dead-center which respective actions provide the necessary compression ratio in the compression cylinders 16 and 17 to automatically explode or burn the transitionally injected fuel and air driven into and between the out-acting power-pistons 19. Thus, the valve action 9 becomes in ratio of speed and revolutions, one sixth that of the drive shaft 4, having six 60 degree spaced port sets comprising a transfer port or passage 44, an intake-exhaust passage 45 and a cam groove and cam or plunger depressor 43 to each of the valve port-sets. To produce a compression ignition ratio, again the strokes of the pistons should be equal to twice the diameter of the bore or more, and the motion of piston reciprocation uniform and harmonic, thus the approximately two and one third times the bore length of stroke or thereabouts is again an essential factor in the operation of the monovalve engine principle in obtaining compression ignition pressures, and transferring them in relative movement to advance-set combustion cylinders. By the foregoing arrangement and principle of operation, the air volume entering through inlet ports 47 passing through valve ports 45, and into compression cylinders 16—17 is compressed therein and transferred through valve port 44 into explosion cylinders 14—15 of each respective set; the fuel being injected through jet 145 of each respective set into the valve transfer port 44, the shearing off of the fuel at jet 145 into the air-stream under 1000 degrees of compression heat, and at nearly a mile a second velocity combined with cyclonic turbulence as the fuel and air split against the transfer-port end to equally fill the retreating displacement of the outgoing power pistons 19. The combustion takes place from the fuel transformation taking place sheared to near-infinity off the fuel jets and blasted into the power cylinders in a state of flame. Thus, there is no usual process of flame propagation, as instantaneous transformation of fuel under high temperatures produces combustion but little beyond the period of transfer and injection, expanding in the greater displacement explosion cylinder to more than one and six tenths the volume of its intake displacement instead of six tenths its intake volume as applies in present engines before the exhaust valve opens. Thus, the duplex-opposed four-cylinder monovalve set-unit of co-acting operation enables compound-expansion of the combustion in the power delivery cylinders 14—15 to nearly atmospheric pressure before being exhausted out through ports 49. The power pistons 19 meeting against the valve 9 in exhausting the burned residual gases, provides full scavenging, with a substantially noiseless exhaust. The introduction of fuel into the transferring airstream obviates mixing devices, atomizers, carburetors, or preheaters, eliminates compression spaces, ignition devices, blowers or scavenging devices, prevents pre-ignition, back-thrust or the possibility of detonation, and enables any type of fuel to be employed from crude oil to volatile ether without change or adjustment of the throttle valve 118 or change of fuel pressure regulator valve 119 in the fuel pump. The intake air volume at low altitudes remaining constant, the throttle valve 118, by increasing or lessening the volume of fuel admitted to the fuel ring 133, governs the speed and power of the engine, the engine being stopped by closing the fuel throttle. The fuel pump volume capacity exceeding the maximum fuel requirements, the excess fuel is by-passed by fuel pressure regulator valve 119 into a reduced pressure take off chamber leading to the starter pressure tank 91, the reduced pressure for starter tank charging being controlled by starter pressure regulator valve 121 and the tank charging outlet at 97, the overflow being by-passed into passage 122 leading back into the fuel pump intake 112.

The supercharger 60, Figs. 1, 3 and 7 is preferably operated in rarified atmosphere and is inducted through the opening at the forward end of main shaft 4. This air enters through ports 63 and between the blades of the centrifugal fan 62, around which revolves a counter turbine ring 64 running at an increased speed in the opposite direction. The air is scooped and forced out through restricted jet outlets contracted in the outlet orifices to maintain a high air velocity and pressure to prevent regurgitation and back-flow of air discharged therefrom into circular anti-chamber 58 leading to radiating air ducts 57 and communicating with air intake ports 47. The air pressure in anti-chamber 58 is sealed against internal leakage into the engine by the hub bearings on counter turbine 64 and contraction rings in sealed end plates 64a engaging the sub peripherial hubs 64b on the counter turbine 64. To operate, clutch lever 77, Figs. 13 and 14, releases held back sleeve 75 engaging clutch 74 to engage clutch cone on gear 71 driving pinion 70, gear 68 and turbine gear 67. Ring closing induction valve 51 via of gear 55, see Fig. 3, is then rotated to close all the free air ports or ducts 47 leading to each 4-cylinder set, which, governed by the degree of air escapement allowed, controls the desired air pressure delivered to valve 9.

Having thus described my invention, what is claimed as new and desired to be secured by Letters Patent is:

1. In an internal combustion engine of the compression ignition type, said engine comprising alternate opposing pairs of air-compression cylinders and opposing pairs of explosion cylinders, regulated air inlets for the compression cylinders, exhaust outlets for the explosion cylinders, two-stroke action pistons in the compression cylinders and means to move the pistons so that opposing pistons have opposite motion and meet in a predetermined sequence, two-stroke action pistons in the explosion cylinders and means to regulate the movement of these pistons so that opposing pistons have opposite motion and meet in a lead sequence with respect to the compression cylinders supplying the air thereto, a rotating cylinder-head type of valve plate intermediate and between the opposed ends of the cylinders, means adapted to admit air into the compression cylinders and from there transfer the air into the explosion cylinders, means to diffuse fuel into the air while in transfer between the compression cylinders and the explosion cylinders and ignite the fuel-air mixture by the heat of compression of the air, means to conduct the ignited mixture to the explosion cylinders over the pistons therein during the beginning of their working stroke, and means to exhaust the burned gases at the end of the power strokes of each explosion cylinder.

2. In an internal combustion engine of the compression-ignition type, said engine having a plurality of opposed pairs of explosion cylinders and a plurality of opposed pairs of air compression cylinders intermediate the pairs of explosion cylinders, means mating each explosion cylinder with a neighboring compression cylinder, a piston in each cylinder, means to force the pistons in the explosion cylinders to meet and reverse in lead sequence with respect to the motion of the pistons in their mated air compressor cylinders, means for causing the air compressing pistons to meet in a timed lag sequence with respect to their mated explosion cylinder piston so as to empty their compressed air into their respective mated explosion cylinder, a revolving cylinder-head valve plate between the pairs of opposed cylinders having means to conduct air to the air compressing cylinders and conduct the compressed air into the explosion cylinders, means in the plate to control the admission of fuel into the compressed air while in transfer between the compression and explosion cylinders, and means in the plate to exhaust burned gases from the explosion cylinders to the atmosphere.

3. In an internal combustion engine, a rotary valve disc, means for supporting the disc and rotating it, a cylinder unit on each side of the disc and each having a plurality of open ended cyinders with resiprocating pistons therein, said cylinders having their fuel-mixture receiving open ends abutting the disc so that said open ends are substantially in a common plane, each cylinder unit having their cylinders spaced apart in a manner that alternate cylinders are explosion cylinders and alternate cylinders are air compressing cylinders, said units having a common axis and positioned so that all the explosion cylinders of one unit are registered with the explosion cylinders of the other unit, means controlled by the disc for admitting compressed air from the compression cylinders into the explosion cylinders, means controlled by the disc for exhausting burned gases from the explosion cylinders to the atmosphere, and means controlled by the disc for admitting fuel into the compressed air while enroute to the explosion cylinders.

4. The engine recited in claim 3 wherein the disc has a plurality of equally spaced apart cutouts along the perimeter thereof and a slot inwardly but near each cutout, and a cam track concentric with the disc and in the disc; the cutouts providing exhaust ports, the slots hot gas ports between pairs of cylinders, and the track a means for controlling the injection of fuel into the hot gases in the slots.

5. In a multi-cylinder internal combustion engine with a piston in each cylinder, a pair of cylinder units slightly spaced apart to provide disc space, each unit having an equal number of explosion and air compression cylinders therein with the piston heads of all cylinders of each unit opposite one another, a disc-like rotatable valve and cylinderhead element operable through the disc space between the opposing ends of the said cylinders, a series of alike spaced apart port-sets in equal segments of the valve element, each port-set comprising a full-function valve unit including a common intake and exhaust port and a compressed air transfer passage, a fuel admission timer track in the central portion of the valve element designed to control the fuel admission to the said compressed air transfer passage, means to rotate the valve element in unicycle port-set sequence with the reciprocable opposed pistons, means to reciprocate the pistons of the air compression cylinders, a powershaft connected with the pistons of the explosion cylinders, and means connecting a supply of fuel with each transfer passage in the said valve element.

6. The engine recited in claim 5 wherein a primary air compressor is connected with the shaft and concentric therewith, and means connecting the compressor with the intake and exhaust port of the valve element for conduction of precompressed air into the air compression cylders, an inlet for air into the compressor, said shaft being open at one end to conduct air into the compressor via said inlet.

7. In an all-type fluid fuel burning compression-ignition engine, a pair of abutting cylinder units, each unit having a plurality of explosion and air compressing cylinders, the compressing cylinders having a constant volume air intake and opposed pistons in lag-meeting sequence void of compression spaces, a pair of coacting opposed intercommunicable explosion cylinders with opposed pistons in lead-meeting sequence with respect to the compression cylinders and also void of compression spaces, the last recited pistons being adapted by lead movement to reciprocate to their meeting ends and reverse in advance of the lag-meeting air compressor pistons to provide reversal displacement into which the air compression pistons can compress their charge into the explosion cylinders, and means to fuel charge the air in transfer between the compression and explosion cylinders.

8. The engine recited in claim 7 wherein a thin disc-like valve element is provided to rotate intermediate and between the said opposing pairs of units, said valve element operating to time the sequence of admission of air from its compression to ignition temperature in the compression cylinders and transfer the compressed hot air to the explosion cylinders, means to interdiffuse fuel into the hot air to atomize and ignite the charge before the charge enters the explosion cylinders.

9. In an internal combustion compression-ignition type engine embodying a housing with a powershaft therethrough, a pair of cylinder-block units surrounding the powershaft and within the housing, each unit having a plurality of opposed and alined cylinders with reciprocating pistons therein, a mechanism connecting the powershaft with the pistons for transmission of power between them, a disc-like valve element intermediate the units and having a plurality of ports acting as air inlets to half of the cylinders and exhaust outlets to the other half of the cylinders, alternate cylinders of each unit providing air compressing chambers and the other cylinders of each unit providing power delivery chambers, a plurality of passage slots in the valve element positioned and arranged for conducting hot fuel igniting air from the compressing chambers to the power delivery chambers at predetermined intervals, a fuel supply means having a regulated outlet in communication with the passage slots of the valve element to diffuse fuel into the hot air passing through the slots and form a highly combustible ignited mixture before the mixture enters into any of the power delivery chambers.

10. In an internal combustion compression-ignition compound two-cycle engine having a central shaft for delivery of power therefrom, a plurality of tandem-pairs of cylinders about the shaft, each tandem-pair comprising two pairs of mated parallel alined cylinders wherein each pair is opposed to one another, a piston in each cylinder, each pair of mated cylinders having their pistons timed so that one leads the other and thus present lag and lead cylinders, a valve disc concentric with the shaft and positioned so that the sides thereof act as the cylinder head for all the cylinders, means in the disc for allowing air to be supplied to the lag cylinders in a predetermined sequence, passage means in the disc to allow highly heated air from the lag cylinders to enter the lead cylinders in a predetermined sequence, means for conducting burned gases from the lead cylinders in a predetermined sequence, and fuel injection means connected with said passage means for injecting fuel into the highly heated air to form an ignited explosive mixture as the air is passing therethrough bound for its respective mated lead cylinder wherein the mixture is expanded to produce power, and means connecting the pistons in all the cylinders with the shaft.

11. In a compression-fired engine having a housing consisting of a pair of flanged cup-shaped shells with the flanges joined on opposite sides of an intermediate ring to provide a disc space between the flanges and an engine chamber between the shells, a shaft passing through the housing, a disc shaped valve plate in the disc space concentric with the shaft, means for rotating the plate in said space, the flange of one of the shells having a plurality of spaced apart air inlet ports and the flange of the other shell having a plurality of exhaust ports, a cylinder block unit on each side of the plate, a plurality of cylinder bores with pistons therein in each block having their open heads in a substantial common plane and employing the plate as their head closures, each block having their bores arranged in operational compression-explosion pairs so that alternate bores are explosion cylinders and the other intermediate bores are air compression cylinders, means connecting the pistons with the shaft and for timing the pistons so that the explosion cylinder pistons are a little in the lead with their respective compression cylinder piston, means in the plate for connecting the air inlet ports with the compression cylinders in sequence, means in the plate for connecting the exhaust ports with the explosion cylinders in sequence, passage means in the plate for connecting the explosion cylinders in connection with their respective compression cylinders in sequence, means for injecting a fuel into the passage means in sequence, and diffusing means controlled by the operation of the plate for intermittently injecting fuel into said passage means when superheated air is passing from any compression cylinder into its respective connected explosion cylinder, and means for supplying fuel to the diffusing means under pressure.

12. In a mono-valve engine having a rotatable cylinder-head disc-like valve dividing and coordinating two opposing cylinder and piston units surrounding a central powershaft, each unit having a plurality of power cylinders with inlet and outlet ports and alternate air compressor cylinders with inlet and outlet ports, the said valve comprising a common means of air induction through a single port to two opposing simultaneous acting air compressing pistons, a common means for exhausting burned gas from two opposing power delivery cylinders with simultaneous meeting pistons therein, transfer passages in the valve each one acting between two meeting air compressor pistons to permit the discharge of the two volumes of compressed air through a single transfer passage into two intercommunicable opposed power delivery cylinders, means to introduce fuel into the air in transit through the transfer passage, the said rotatable valve sealing the ends of all the air compressing cylinders during compression and all the power delivery cylinders during explosions and thus permitting the joint discharge of two opposed cylinders of compressed air through one transfer passage into two opposed power delivery cylinders.

RANSOM Y. BOVEE.

REFERENCES CITED

The following references are of record in the file of this patent:

UNITED STATES PATENTS

| Number | Name | Date |
|---|---|---|
| 951,093 | Remington | Mar. 1, 1910 |
| 1,005,118 | Rabsilber | Oct. 3, 1911 |
| 1,978,194 | Gray | Oct. 23, 1934 |
| 2,263,561 | Biermann | Nov. 25, 1941 |
| 960,063 | Beckmann | May 31, 1910 |
| 1,413,363 | Smith et al. | Apr. 18, 1922 |
| 1,895,851 | Jannin et al. | Jan. 31, 1933 |
| 1,826,325 | Paul | Oct. 6, 1931 |
| 1,919,755 | Sherman | July 25, 1933 |
| 1,904,499 | McLaren | Apr. 18, 1933 |
| 1,808,380 | Royal | June 2, 1931 |
| 1,168,877 | Froehlich | Jan. 18, 1916 |
| 1,610,060 | Lind | Dec. 7, 1926 |
| 780,549 | Callan | Jan. 24, 1905 |
| 1,145,820 | Summerill | July 6, 1915 |